Aug. 26, 1924.

D. C. McMILLAN 1,506,376

DOUBLE SNATCH BLOCK

Filed April 11, 1922

INVENTOR
Donald C. McMillan
BY
ATTORNEY

Patented Aug. 26, 1924.

1,506,376

UNITED STATES PATENT OFFICE.

DONALD C. McMILLAN, OF BROOKLYN, NEW YORK.

DOUBLE SNATCH BLOCK.

Application filed April 11, 1922. Serial No. 551,528.

*To all whom it may concern:*

Be it known that I, DONALD C. McMIL-LAN, a citizen of the United States, and resident of the borough of Brooklyn, county of Kings, city and State of New York, have invented new and useful Improvements in Double Snatch Blocks, of which the following is the specification.

The object of this invention is to produce a snatch block for use with comparatively light tackle which it is desired to handle quickly and for this reason, the locking device which serves as an additional support for the free side of the block and which is present in the ordinary snatch block is here omitted.

Another object of the invention is to provide a block so constructed as to withstand the strains of use and for that purpose the outside supports for the sheaves are secured to a centrally disposed strap.

Another object of the invention is to omit from the construction, projections, hooks or latches that might prevent the rapid and easy entrance of the tackle into the block and the disengagement therefrom.

With these and other objects in view, the following is what I consider the best means for carrying out this invention and the accompanying drawing should be referred to for a complete understanding of the specification which follows.

In the drawing:—

Similar reference numerals indicate like parts in all the figures where they appear.

Figure 1:
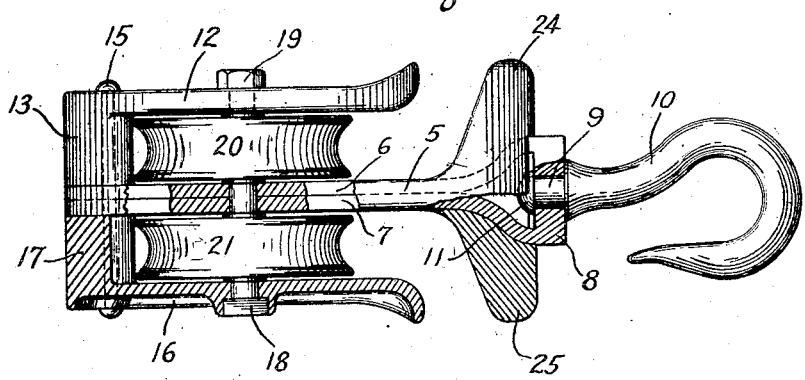
Fig. 1, is a side elevation, partly in section of a snatch block constructed according to my invention.

In side elevation, my block has somewhat the appearance of an inverted T.

A central staff or primary supporting member 5 may be formed as a casting or forging having a central longitudinal recess extending through its full length. Arranged in this central recess is a strap member having parallel arms 6 and 7 joined at their base by a bar or loop 8, which is also perforated as shown at 9.

In this loop 8 and through the perforation 9, I engage a hook 10 and this hook is retained by heading over the shank passing through the perforation as shown at 11.

Figure 2:
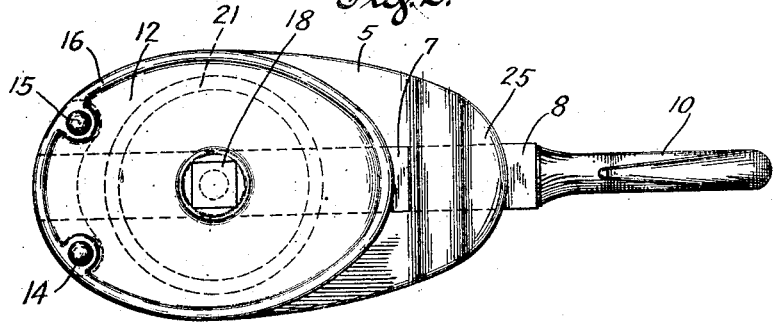
Fig. 2, is an elevation at right angles to that shown in Fig. 1.

The arms of the T are formed of forgings or castings in the shape of an oval as shown at 12 in Fig. 2. These oval plates 12, are each provided with a spreader or spacer 13 secured to the central staff or supporting member 5 and I have shown a plurality of rivets 14 and 15 extending through the plates 12 and 16 and their spacing members 13 and 17 and through the central staff 5 and arms 6 and 7 extending therethrough and I desire that a suitable number of rivets 14 and 15 be provided to secure the whole in practically integral formation.

Extending from the free arms of the T, that is through the plates 12 and 16 and the central supporting member 5 and strap arms 6 and 7, is a bolt 18 of liberal dimension and upon this bolt I arrange a nut 19.

Supported upon the bolt 18 and between the arms and the central staff or supporting member are sheaves as shown at 20 and 21. These sheaves are freely rotatable upon the shaft 18 and may be provided with antifriction bushings as shown at 22 in Fig. 3. These bushings may be formed of brass having inserts or plugs of graphite as indicated at 23.

The base of the central strap member 5 is provided with projections 24 and 25 which serve as guides and shields, guiding the tackle into the block to be received by the sheaves 20 and 21 and shielding the tackle, so that it cannot become fouled with the lashings or support for the hook 10.

Figure 3:
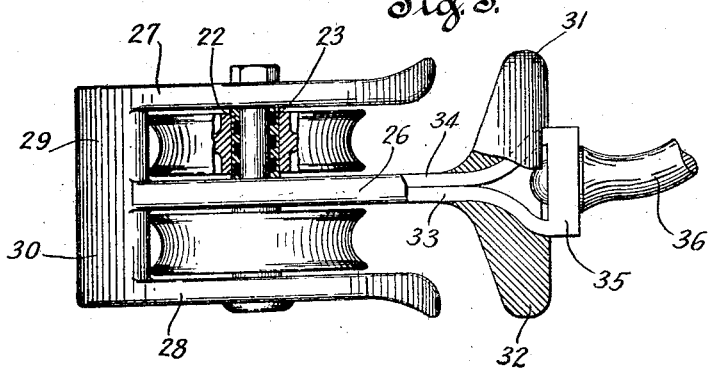
Fig. 3, is a view similar to Fig. 1 and showing a block of somewhat different construction.

In Fig. 3, the central staff member 26, the oval plates 27 and 28, the spacers 29 and 30 and the guide projections or shields 31 and 32 are formed integral. This integral formation is possible if the whole is made as a casting. It will be understood, however, that a recess is provided for a hook or supporting member which, as shown in Fig. 1, should be provided with parallel arms 33 and 34 joined by a strap or loop 35, into which the hook or supporting member 36 is secured.

While I understand that the selection of material is not important from a patentable point of view, I feel that it is essential, however, to state that the selection of material and the size of certain parts, is important from a commercial stand-point and I prefer that the hook 10 should be hand wrought, that the straps 6 and 7 and bar or loop 8 should be of selected material.

wrought steel, or wrought iron and that the body of the device shown in Figs. 1 and 2 should be formed of cast steel, malleable iron or bronze. The rivets 14 and 15 should be of liberal size and of carefully selected material as should the bolt 18.

In the construction shown in Fig. 3, I prefer that malleable iron or bronze should be employed throughout, with the exception of the hook 36 and hook supporting member 33—35.

I am aware that the size and shape of this device may be changed at will, that less carefully selected material may be employed in the construction, that ordinary non-bushed sheaves may be employed and that other modifications may be made within the scope of the appended claims, without departing from the principle or sacrificing the advantages of the invention, though I prefer the whole as shown and described.

Having carefully and fully described my invention, what I claim and desire to obtain by Letters Patent of the United States is as follows:—

1. A double snatch block having a centrally disposed member provided with a longitudinal recess, arms secured to said central member, sheaves between said arms and said centrally disposed member and a supporting means and means extending through said centrally disposed member to which said supporting means is secured.

2. A snatch block, comprising a centrally disposed member provided with a longitudinal recess, straps extending through said recess, guide and supporting plates arranged one at each side of the said central member, sheaves between said central member and said plates and means for securing said plates to said straps and said centrally disposed member.

Signed at the city, county and State of New York, this 22 day of March, 1922.

DONALD C. McMILLAN.